Jan. 1, 1952 J. C. BARTCH ET AL 2,580,640
SPROUT DESTROYER
Filed May 27, 1948 3 Sheets-Sheet 1

INVENTORS
JAMES C. BARTCH
GEORGE W. COUCH
BY *John H. Cassidy*
ATTORNEY

Jan. 1, 1952

J. C. BARTCH ET AL 2,580,640

SPROUT DESTROYER

Filed May 27, 1948

INVENTORS
JAMES C. BARTCH
GEORGE W. COUCH

BY *John H. Cassidy*

ATTORNEY

Jan. 1, 1952 J. C. BARTCH ET AL 2,580,640
SPROUT DESTROYER

Filed May 27, 1948 3 Sheets-Sheet 3

INVENTORS
JAMES C. BARTCH
GEORGE W. COUCH
BY
ATTORNEY

Patented Jan. 1, 1952

2,580,640

UNITED STATES PATENT OFFICE 2,580,640

SPROUT DESTROYER

James C. Bartch, Flat River, and George W. Couch, Rivermines, Mo.

Application May 27, 1948, Serial No. 29,473

6 Claims. (Cl. 97—40)

Broadly speaking, this invention relates to sprout destroyers of the rotating drum type, and the same concerns itself more particularly with improvements to such machines providing for the lubricating of the flexible beating elements thereof, greater ruggedness and improved mounting and spacing of the flexible beating elements of the sprout destroyer.

As is well known in the art, link chains have been proven to make the best beating elements for sprout destroyers of this type. However, due to their structure and the severe treatment they receive in use, such chains are subject to extraordinary wear and their replacement becomes an important factor in the maintenance of the machine. Moreover, problems involving the sturdiness of the machine and the mounting and spacing of its beating elements have presented themselves.

Accordingly, it may be stated that the general object of this invention is to provide a sprout destroyer of the type described which is extremely rugged, one which is compact and neat in appearance, economical to construct and maintain, and one which is provided with means for continuously lubricating the flexible beating elements thereof during operation, said beating elements having improved mounting means and improved spacing arrangement on the drum to which they are attached.

Other objects and advantages will become apparent as the specification proceeds and a more comprehensive understanding of the invention will be afforded from the following detailed description when considered in conjunction with the accompanying drawings, in which.

Figure 1:
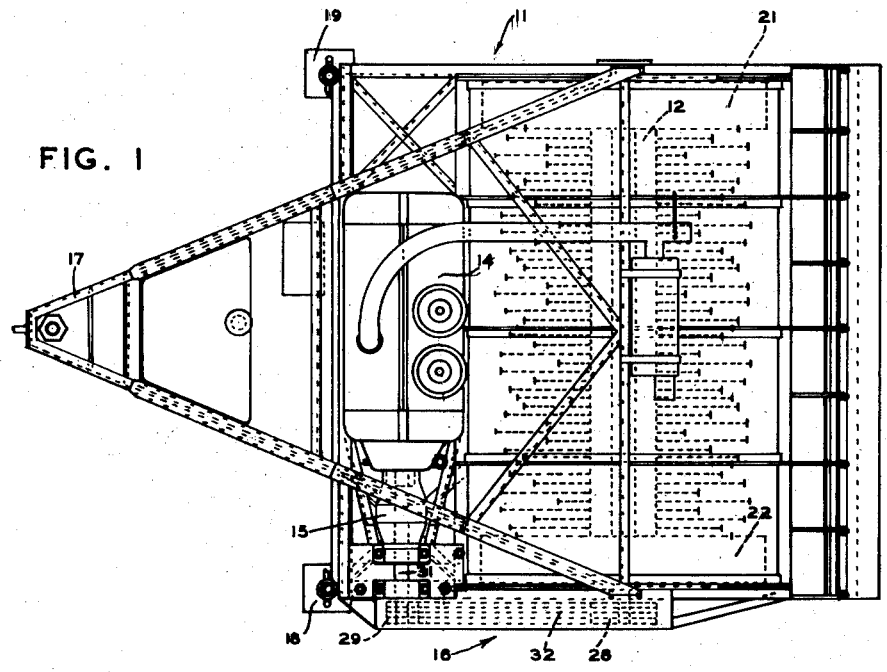
Fig. 1 is a top view of a sprout destroyer embodying the instant invention.
Figure 2:
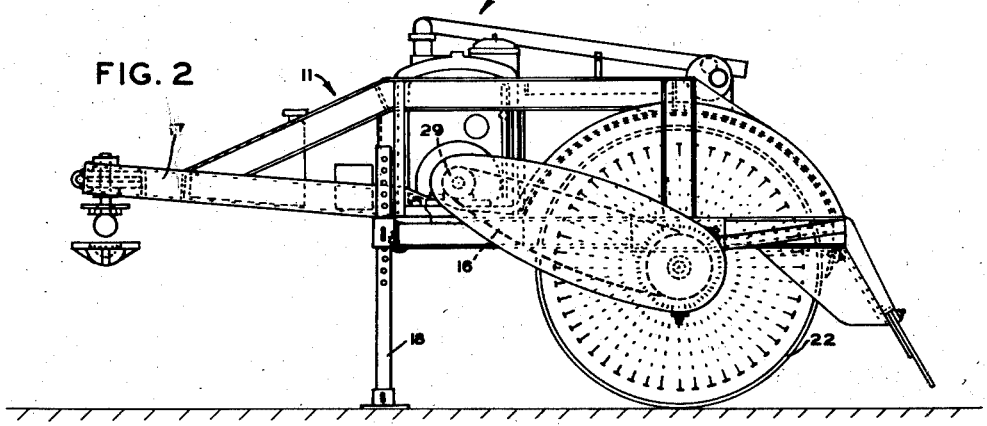
Fig. 2 is an end view of the same.
Figure 3:
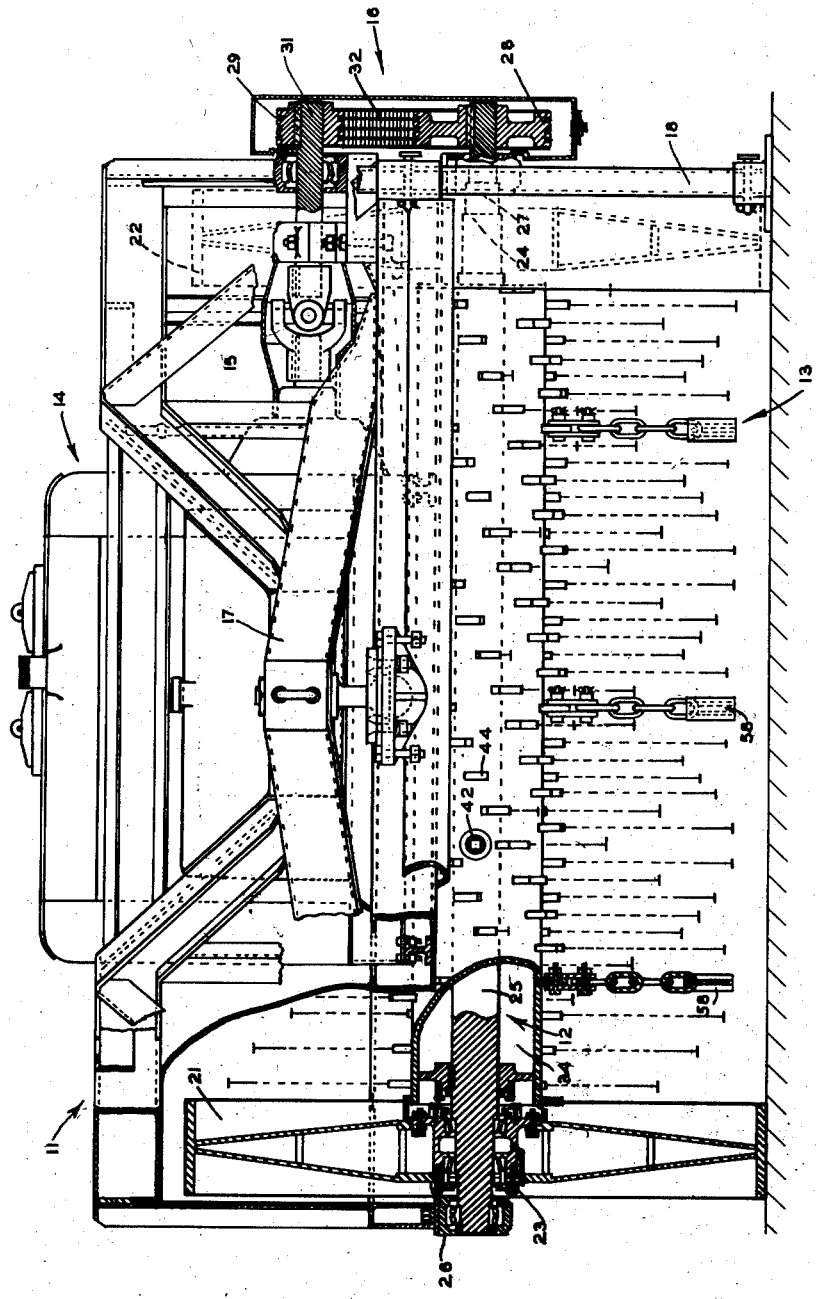
Fig. 3 is a front view of the same, in partial section, showing the connections between the machine's traction wheels and its rotating drum and the driving mechanism for the latter element.

With reference to Figs. 1 to 3, inclusive, the sprout destroyer embodying the instant invention is illustrated as comprising a frame 11 in which is supported a drum 12 mounting a plurality of flexible beating elements 13, which drum is rotated by means of a gasoline engine 14 also mounted on the frame 11. The drum 12 is driven by the engine 14 through a universal joint 15 and a chain drive 16.

The frame 11 is rigidly constructed of a plurality of channel irons all in a manner as shown. To the frame 11 is connected a reinforced draft member 17 by means of which the sprout destroyer is connected to a tractor, or the like, used to propel the same over the area on which the growth is to be destroyed. Also, a pair of parking legs 18 and 19 are connected to the frame 11 for supporting the destroyer in a horizontal position when the same is not connected to a tractor or other propelling device.

The entire machine is carried on two traction wheels 21 and 22 for movement over the ground. As is illustrated in Fig. 3, the traction wheels 21 and 22 are provided with bearinged hubs 23 and 24 which permit them to turn on a shaft 25 journalled at 26 and 27 in the lower horizontal members of the frame 11. At one end of the shaft 25, which extends through the journal 27 there is keyed a pulley 28 forming a part of the chain drive 16. A second pulley 29, which is keyed to a stub shaft 31 connecting with the universal joint 15, also forms a part of the chain drive 16 and drives a chain 32, to drive the pulley 28.

Through the mechanism just described, the machine's rotating drum 12 is free to be turned at approximately 600 R. P. M. by the engine 14, and the entire machine is free to be moved on the traction wheels 21 and 22 by means of a tractor or other suitable propelling device.

Figures 4, 5, 6, 7, 8, 9:
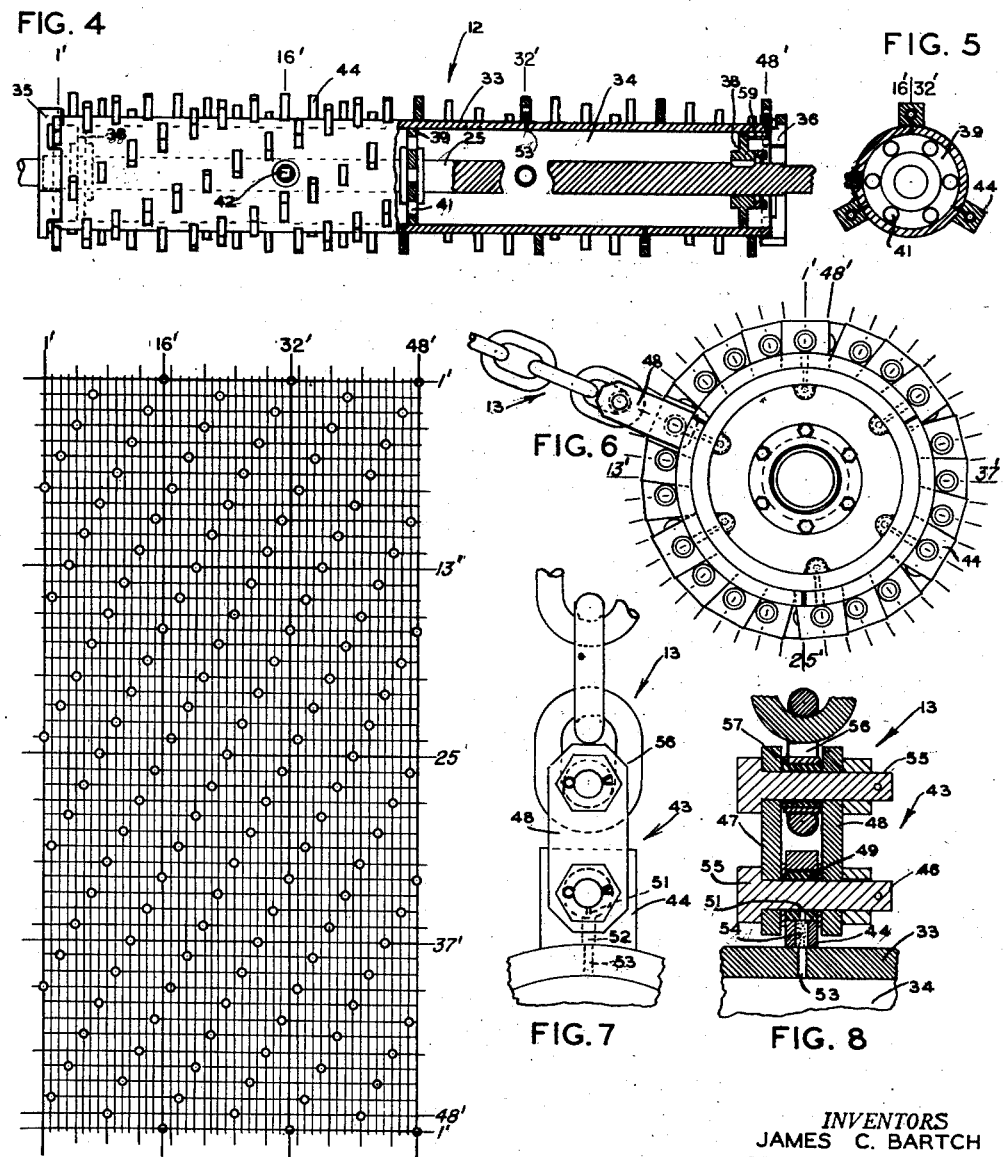
Fig. 4 is a front view, in partial section, of the machine's rotating drum and driving shaft.
Fig. 5 is a cross sectional view of the said drum taken therethrough at either the line 16' or 32' indicated on Fig. 4 with observation toward the center of the drum.
Fig. 6 is an end view of the drum and its driving shaft illustrating a mode of attachment of the flexible beating members connected thereto.
Fig. 7 is a side view of an improved connector employed to attach the flexible beating elements to the drum.
Fig. 8 is a cross sectional view of the said improved connector showing the lubricating connection between the drum and the flexible beating element.
Fig. 9 is a space diagram illustrating the arrangement of the machine's flexible beating elements on the drum.

The rotating drum 12, which is illustrated in detail in Figs. 4 and 5, is mounted on the drive shaft 25 to be turned or driven thereby. This drum comprises a tube 33, which, in addition to its function of supporting the flexible beating members 13, also serves as an oil reservoir 34.

The tube 33 is closed at its ends by two split ring opening guards 35 and 36 and has welded therein two end hubs 37 and 38 and a perforated center hub 39 by means of which the tube is keyed to the shaft 25. The perforations 41 in the center hub 39 allow a free flow of oil throughout the length of the reservoir 34. A filler opening and plug 42 is also provided for admitting lubricating oil to the reservoir 34.

The flexible beating elements 13, which in the illustrative example, take the form of link chains, are attached to the drum 12 by improved means. A connector such as is illustrated in detail in Figs. 7 and 8 serves this purpose. Here, the connector, generally designated by the reference numeral 43, comprises a rigid lug 44 which is welded on the outside of the tube 33. This lug is drilled transversely to receive a pin 46 which is passed through two movable links 47 and 48, the ends of which latter elements straddle the rigid lug 44. A bushing 49 is inserted in the bore of the rigid lug 44, and has a hole 51 drilled therein which communicates with an enlarged port 52 drilled in the rigid lug 44. The latter port, in turn, communicates with a port 53 drilled through the wall of the tube 33 to pass into the oil reservoir 34. Within the port 52 there is placed an oil retainer 54 which prohibits the seepage of oil through the sleeve bearing 49 while the rotating drum 12 is at rest. This retainer is of such character that the same passes oil from the reservoir 34 to the flexible members 13 under the action of centrifugal force during the time the drum is rotated.

The flexible beating element 13 is attached to a connector 43 by means of a pin 55 forming a part of the latter, which is passed through the links 47 and 48. An end link 56 of the beating element 13 is adapted to receive a bushing 57 through which the pin 55 is passed. As viewed in Fig. 3, each beating element has a weight 58 attached to its free end which keeps the same extended and enhances its destroying effects.

With reference to Fig. 4, it will be seen that certain ones of the connectors 43 are attached to the tube 33 at points beyond the drum hubs 37 and 38. This is done in order to take advantage of the full length of the tube for the mounting of beating elements. For the connectors that are so positioned, the lubricant in the reservoir 34 is fed to them by individual connecting lines 59. These lines have one of their ends connecting with a hole drilled in the end hub and the other end welded to the inside of the tube 33 so as to communicate with one of the ports 53 drilled in the latter. With this provision, all connectors are supplied with the lubricant from the reservoir 34.

When the drum 12 is rotated at its desired speed, oil from the reservoir is passed through the ports 53, 52 and 51 onto the various component parts of the connector 43 and each of the flexible members 13 are thereby continuously supplied with lubricating oil. Moreover, this lubricant is passed outwardly along the chain to lubricate the links thereof. In this manner a lubricant is continuously supplied to the flexible beating elements at the points of connection with the drum, through which expedient the wear of the fleible beating element and its connector is reduced to a minimum.

With reference to Fig. 9, the flexible beating elements 13 are spaced around the tube in 48 rows. Likewise these elements are spaced along the length of the tube in 48 rows all as shown in the figure. By means of this arrangement of the beating elements, the effective beating area of the drum may be altered from a maximum downwardly, without affecting its balancing. For example, for certain growths it may be desirable to operate with fewer beating elements and a smaller capacity power plant 14. In such case, selected rows of beating elements, lengthwise of the drum, may be removed without affecting the balance of the latter as a revolving mass. In this way a standard drum may be conditioned for different use requirements dependent upon the nature of the growth to be destroyed.

Various changes may be made in the details of construction, within the scope of the appended claims, without departing from the spirit of this invention. Parts of the invention may be added while retaining some or all of the advantages of the invention.

What is claimed is:

1. In a sprout destroyer having a frame and wheels for supporting said frame for movement over terrain, the improvement comprising a drum supported for rotation on said frame, a plurality of flexible sprout beating elements connected to said drum to be rotated thereby, a driving mechanism for rotating said drum and said flexible beating elements, and a connector having ports communicating with a lubricant reservoir within said drum for attaching each of said flexible beating elements to said drum operative to pass a lubricant to said elements upon rotation of said drum.

2. In a sprout destroyer having a rotatable drum and a plurality of flexible beating elements attached thereto, improved means for connecting said elements to said drum comprising a rigid link attached to said drum, a movable link connecting said rigid link with one of said flexible elements, and a passageway from the inside of said drum through said rigid link for passing a lubricant from said drum to said flexible beating element.

3. In a sprout destroyer having a rotatable drum and a plurality of flexible beating elements attached thereto, improved means for connecting said elements to said drum comprising a rigid link attached to said drum, a movable link connecting said rigid link with one of said flexible elements, a passageway from the inside of said drum through said rigid link for passing a lubricant from said drum to said flexible beating element, and a retainer positioned in said passageway adapted to pass said lubricant only when said drum is rotated.

4. In a sprout destroyer having a rotatable drum and a flexible beating element attached thereto, a connector for attaching said beating element to said drum comprising a rigid link secured to said drum, a pair of movable links each positioned on the sides of said rigid link, a first pin passed through said movable and said rigid links, a first bushing interposed between the bearing surfaces of said rigid link and said first pin, a second pin passed through said movable links and a link of said flexible element, a second bushing interposed between said second pin and the said link of said flexible element, and a lubricant passageway from said drum through said rigid link and said first bushing for passing a lubricant from said drum to said beating element.

5. In a sprout destroyer having a rotatable drum and a flexible beating element attached thereto, a connector for attaching said beating element to said drum as claimed in claim 4 including a lubricant retainer positioned in said passageway adapted to pass said lubricant only when said drum is rotated.

6. A sprout destroyer having in combination a frame supported on wheels for movement over terrain, a rotatable drum constructed and arranged to act as a lubricant reservoir journalled on said frame, a plurality of flexible beating elements attached radially on the outer periphery of said rotatable drum, and lubricating means constructed and arranged to feed lubricant from the drum to the beating elements.

JAMES C. BARTCH.
GEORGE W. COUCH.

REFERENCES CITED

The following references are of record in the file of this patent:

UNITED STATES PATENTS

| Number | Name | Date |
|---|---|---|
| 385,417 | MacDonald | July 3, 1888 |
| 1,035,056 | Shubert et al. | Aug. 6, 1912 |
| 1,938,042 | Robinson | Dec. 5, 1933 |
| 2,030,646 | Longo | Feb. 11, 1936 |
| 2,341,486 | Swertfeger | Feb. 8, 1944 |